Jan. 4, 1966 W. C. DAUSER 3,227,040

COLOR HEAD

Filed May 17, 1962

3 Sheets-Sheet 1

INVENTOR.
WILLIAM C. DAUSER

INVENTOR
WILLIAM C. DAUSER

Jan. 4, 1966 W. C. DAUSER 3,227,040

COLOR HEAD

Filed May 17, 1962

3 Sheets-Sheet 3

INVENTOR.
WILLIAM C. DAUSER 3,227,040
COLOR HEAD
William C. Dauser, 458 Melody Lane,
North Muskegon, Mich.
Filed May 17, 1962, Ser. No. 195,476
4 Claims. (Cl. 88—24)

This invention relates to a color lamphouse, especially for color analysis and color photography printing and enlarging.

This invention provides a unique color lamphouse which finds potential use in many fields including color photography, color analysis, color standardizing, color determination and reproduction and others. Since, however, it was originally for color photography purposes, and since its chief intended purpose is in color photography, it will be described and explained largely with respect to this field. Other potential applications will be apparent to those in the art after studying the specification with respect to this field.

Color photography today involves a variety of printing techniques, processes and materials. Generally, the most widely used, however, involve subtractive multi-layer dye-coupling-type printing paper, such as the three layer "type C" paper. The three layers are sensitive respectively to red, green and blue light. The negative film used with this paper is also three layered and includes cyan, magenta, and yellow layers which are responsive respectively to red, green and blue light as is well-known. Typical of such films are Kodak "Kodacolor" and "Ektacolor" films, of which "Ektacolor" film has been found especially suitable in this invention.

To print from a negative of this type, one of two methods is normally used. Many photographers use a conventional white light source transmitted through the negative unto the "type C" paper in a one exposure technique. The white light contains every color in the spectrum, since the wave length range will extend over the entire visible range of light i.e., approximately from 400 to 700 millimicrons. The red, green and blue sensitive layers are not only sensitive to the specific wave length ranges of red, green and blue, but are also subject to "side band exposure" due to their sensitivity to wave lengths other than red, green and blue from the bulb. Therefore, it is common knowledge that single exposure to white light results in a loss of color purity and saturation in the print. Color balance between the three colors also leaves much to be desired. This is so because (1) "exposure" of each of the three layers is dependent upon both time and intensity of the respective red, green and blue light in the white light, (2) the red sensitive dyes, green sensitive dyes, and blue sensitive dyes normally have different response rates, but (3) the time interval of exposure is the same for all three using the single exposure technique. Some semblance of color balance may be restored by inserting subtractive filters for example, between the negative image and the print paper. However, filters placed in the light path always detract from image definition in the print paper. Further, subtractive filtration to slow down the blue and green responsive dyes to that of red, create additional neutral density, which merely adds more exposure to detract from print quality. In spite of these known disadvantages, this method is used by many photographers since it is fast, convenient and simple.

The second major method of printing with "type C" paper involves the successive exposure of the print to filtered red, green and blue light transmitted successively through the film negative. Successive exposures normally enable higher color purity to be achieved. However, since filters or maskings are often used between the negative and print paper, and since anything placed in the image-forming path causes a loss of image definition, this method also results in lowering of some print qualities while improving others.

Multiple exposure also is disadvantageous since it eliminates the possibility of control of local portions of the print achieved by "dodging" or "burning" certain areas. This is so, since a person cannot dodge or burn in the same exact area in the same exact manner three successive times.

Another disadvantage with successive exposures, is that the amount of optimum exposure varies with different types of print paper. Therefore, unless the optimum time of exposure for each layer is determined by trial and error, and held exactly, the effect known as "reciprocity departure" can readily occur.

Therefore, it will be obvious that, from the standpoints of local area control, speed, and convenience, the white light single exposure method is best. From the standpoint of color purity or saturation, the multiple exposure method is best, although when obtaining any semblance of color balance with this method, image definition on the print is normally lowered considerably. It would therefore be extremely advantageous to provide an apparatus which could enable a printing technique having the advantages of both of these, and the disadvantages of neither.

Various attempts have been made to accomplish this over the years, but only one structure is in extensive use today. This structure only partially solves the problem, and involves the use of a plurality of subtractive filters and an integrating sphere. The subtractive filters involve added neutral density and lose effectiveness. The integrating sphere, which is essentially a diffuser, necessarily causes tremendous light losses and provides only limited control. Further, it provides no method of accurately analyzing the color balance situation to provide this control.

Thus, not only is a lamphouse needed that could overcome these known disadvantages of the prior structures, but there is also a need for a highly variable lamphouse adapted to be coupled with an enlarger or a printer, wherein one source of light is not only capable of providing high purity light of only red, green and blue primary colors, but which could also be controlled to effect a source capable of a vast range of possible colors in a closely controlled manner. This would enable exact exposure control of each of the three colors to each of the three sensitive print paper layers. Prior attempts at accomplishing this result have also been made, but have never been successful since the required light intensity and control were not achieved with the combinations and arrangements derived heretofore.

It is therefore an object of this invention to provide a novel color lamphouse that is capable of providing a light source enabling simultaneous exposure of all three layers of red, green and blue sensitive layers of photographic paper to only the three colors red, green and blue. Moreover, it provides exposure of these colors either separately or in a combined manner as desired.

It is another object of this invention to provide a photographic printing and enlarging lamphouse capable of effecting the ease, convenience and local control of the conventional white light, single exposure method, and of simultaneously achieving the purity or saturation of the multiple exposure method, as well as achieving image definition superior to both of these methods. Moreover, it affords optimum color balance control between the three layers of the paper. The apparatus uses no filters between the negative image and the print paper to detract from the image defintion on the print, and it uses no substractive filtration to reduce the light intensity or cause neutral density.

It is another object of this invention to provide a color lamphouse capable of utilizing three separate high intensity white light sources to effect a secondary light source composed of only the primary colors, and yet having a high intensity due to a unique combination and arrangement of components. The device moreover provides accurate control and selection of any color combination imaginable with various mixtures of the three primary colors. It has been used with great success to repeatedly make prints that actually are superior to top rate dye-transfer prints, and yet does so from a "type C," three-layer paper rather than the elaborate dye-transfer materials and steps. It further provides these top quality prints with each try, once the apparatus is calibrated for a batch of paper, and without requiring repeated trial and error attempts for each negative as was necessary heretofore to form fairly good prints from "type C" paper. Moreover, it achieves high quality prints often superior to dye-transfer prints, and does so at a fraction of the cost of dye-transfer processes. It achieves these results in a fraction of the time required for other high quality processes, usually requiring approximately one hour complete as compared to about three days for a dye-transfer print.

It is another object of this invention to provide a color lamphouse light source enabling optimum color balancing in a print produced from a negative even though the negative is a relatively poor quality negative with large color unbalance.

These and many other objects will be apparent upon studying the following specification in conjunction with the drawings in which.

Figure 1:
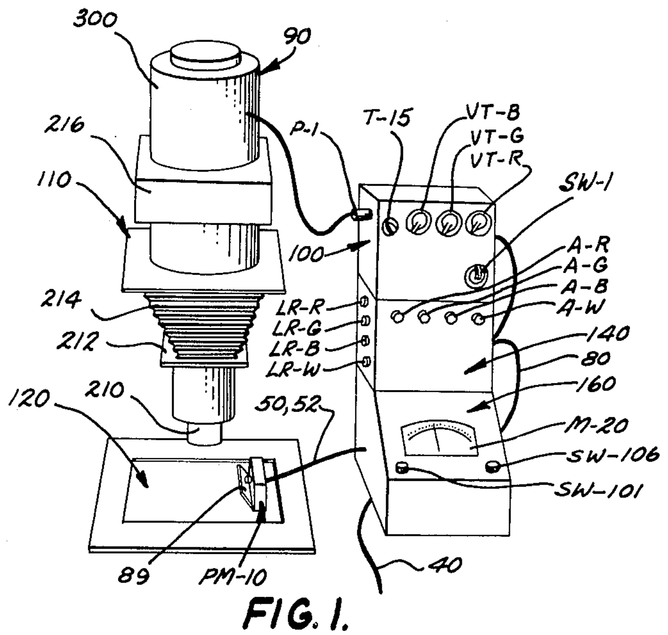
FIG. 1 is a perspective view of a photographic enlarging and printing apparatus utilizing the present invention.

Basically, the inventive color lamphouse light source comprises a plurality of three white light, high intensity, small beam angle sources capable of projecting three light beams, three multi-film spectral selector means in the path of the three white light beams and adapted to transmit three primary color beams unto an opal diffuser which then constitutes a secondary source of pure light composed of only red, green and blue, primary colors. The opal diffuser secondary source is preferably used as a primary source of light for photoprinting in a printing enlarger. The three white light sources are arranged around a central axis at 120° intervals, and have their beams directed generally perpendicular to the central axis. On the axis is a mirror having three mirror surfaces to cooperate respectively with the three spectral color beams. The mirror faces direct the three primary color beams through a common negative lens into a hemispherical opal diffuser. Preferably, heat absorbers are also placed between each source and its mirror surface adjacent the spectral selector means.

Each light source is provided with a variable voltage input control means to enable various mixtures of primary colors, red, green and blue to be achieved on the opal hemisphere, thereby providing any desired mixture of color intensities as the primary source for the enlarger.

Throughout this disclosure, the term "opal diffuser" is used to define a diffuser element which has the characteristics of being translucent, capable of collecting, distributing, scattering, integrating and transmitting light rays of different colors, and thus diffusing such light rays so as to give the effect of one colored light source. A typical "opal diffuser" is made of a substance known as "opal glass."

Referring now to the drawings, the inventive apparatus includes the lamphouse 90 shown mounted on a conventional printing and enlarging head 110 above an easel 120. The lamphouse 90 is utilized with voltage control instrumentation shown as master control 100. It may also be used in conjunction with a photomultiplier tube PM–10 used as a probe, an instrumentation calibration box 140, and a voltage meter 160 which may be calibrated in terms of film "density" of desired.

The novel lamphouse includes a suitable external housing 300 within which is mounted three individually controlled, high intensity, narrow beam white light sources L–G, L–R and L–B. These three sources have a beam angle of 15° or less and are oriented at 120° intervals around the central axis 302, with their beams projecting generally perpendicularly toward the axis. The lamp preferred for this is Phillips lamps No. 13113C/04. Located on the axis is a three faced mirror 320 shaped basically as a three sided pyramid, having its point arranged downwardly on axis 302. The three mirror faces 324 are arranged to cooperate respectively with the three light beams from the three primary light sources. Between each of these respective mirror faces and its light source, are multifilm spectral selectors SS–R, SS–G, and SS–B.

The angles of incidence of the mirror faces of the particular system illustrated are 37°30′, to cause the three color light beams to reflect therefrom and coincide upon the negative lens 340. These angles of incidence will be determined by the beam angle of the lamp and the length of the projection system.

Figure 2:
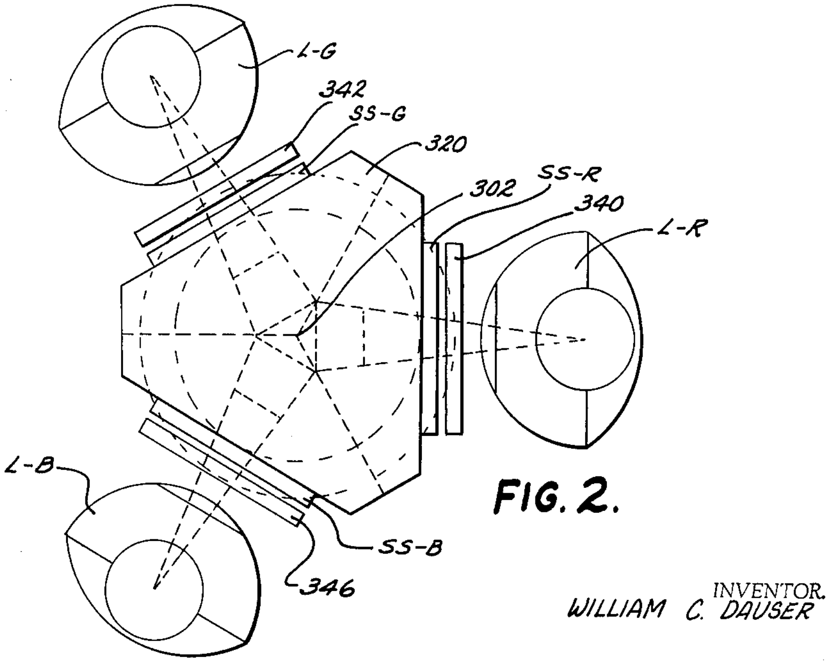
FIG. 2 is a plan view of the optical components of the novel apparatus.
Figure 3:
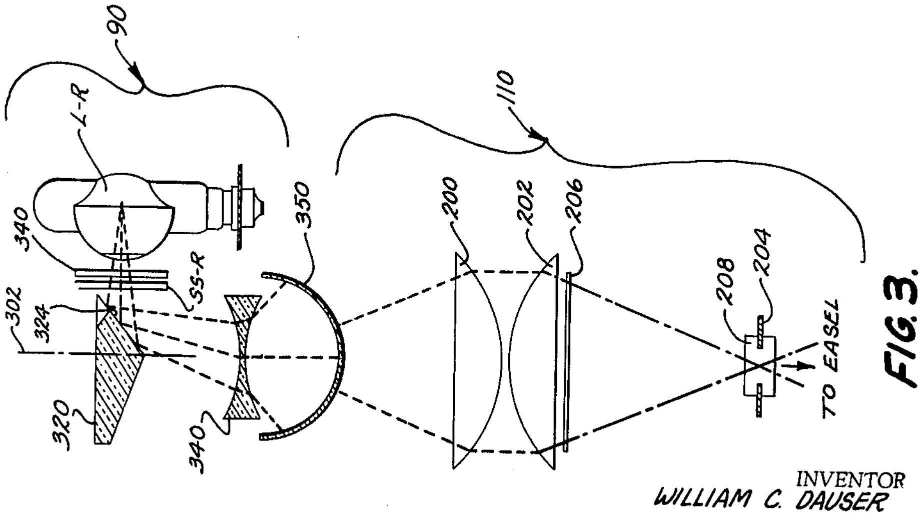
FIG. 3 is a front elevational view of these optical components illustrated in FIG. 2.

Spectral selector SS–R allows only red light to pass therethrough, while reflecting all of other wave lengths in the normal visual spectrum of about 400 to 700 millimicrons. Spectral selector SS–G allows only green light to pass. Spectral selector SS–B allows only blue to pass. It has been found that the unique combination of these high intensity, narrow beam lamps arranged around the mirror and diffusion in combination with these multifilm spectral selectors causes sufficient light transmission to enable spectral selector separation of the three primary colors, red, green and blue from the white sources, and subsequent reformation thereof into a pure white light composed of only these three primary colors, and yet to do so with sufficient intensity for photographic enlarging purposes. This is a truly unique result which has not been possible heretofore, in spite of various attempts to do so. Applicant has produced print after print of top quality with this apparatus. Each of these multifilm spectral selectors is composed of a transparent base such as quartz or glass upon which is coated a multiple of coatings of rare earth metals. The total thickness of no greater than 40 micro inches usually. These multiple coatings are placed directly one upon another, without any intermediate material being placed therebetween. The multifilm spectral selectors have exceptionally high transmittance, and small losses, and define the desired spectral band concerned with excellent sharpness. These are placed perpendicular to the central axis of the light beams projected toward the three mirror faces as illustrated in FIG. 2. The multifilm spectral selectors which have been found to work exceptionally well are those marketed by Bausch and Lomb and identified as red selector 90–2–600 as coupled with 90–2–540, green 90–4–540 as coupled with 90–2–480, and blue 90–1–480 as coupled with 90–1–540. In each case, the first number identifies the angle of incidence, i.e. the 90° angle as illustrated in FIGS. 2 and 3. The second number is a Bausch and Lomb design designation, which indicates whether the selector is a short, long, or band wave transmitter. The third number defines a functional wave length. If the filter has a single cut-off which must be defined, this third number is the wave length in millimicrons at the 50% transmittance point on this cut-off. This, for example, is true for the blue multifilm selector above which passes wave lengths below the visible range of about 400 millimicrons (ultra-violet) as well as blue. This also is true for the red selector above, which passes wave lengths above the visible range limit of about 700 millimicrons (infrared), as well as red. The green filter, on the other hand, falls in the middle of the visible range from 400 to 700 millimicrons wave length, possesses two cut-offs. Its third number therefore refers to the wave length at the center of the band transmitted.

Explained in another way, for example, in the identification 90-1-480, "1" indicates short wave transmission which means that all waves below 480 millimicrons are transmitted. In 90-2-600, "2" means long wave transmission, that is all waves above 600 millimicrons are transmitted. In 90-4-540, "4" means a band width transmission, namely transmission of a band of frequencies between 530 and 550 millimicrons.

Pereferably, heat absorbers 340, 342 and 346 are also placed in the white light beam paths from the three lamps, and adjacent the spectral selectors.

It will be realized that the three faces 324 of the mirror 320 reflect the three primary colors, red, green and blue unto the negative lens 340. The combined three primary colors are directed into the hemispherical opal diffuser 350 which combine these three primary colors to form a second white light source, or variations thereof, depending upon the intensity of each primary color projected unto the opal diffuser. In other words, if equal amounts of the three primary colors are projected into the diffuser, achromatic white light will project from opal diffuser 350, which thus acts as a primary source for the enlarger apparatus, even though it comprises a secondary source composed of the three primary color components. In fact, it has been found that if (1) a conventional white light bulb is removed from the conventional enlarger which includes variable lens-stop diaphragm 204, condenser lenses 200 and 202, and enlarger lens 208, and if (2) the lower portion of the bulb is cut-off and utilized as the opal diffuser 350, and then (3) the unique head 90 is mounted upon the conventional enlarger, the apparatus can be operated without any further major modifications being made in the enlarger apparatus.

Figure 5:
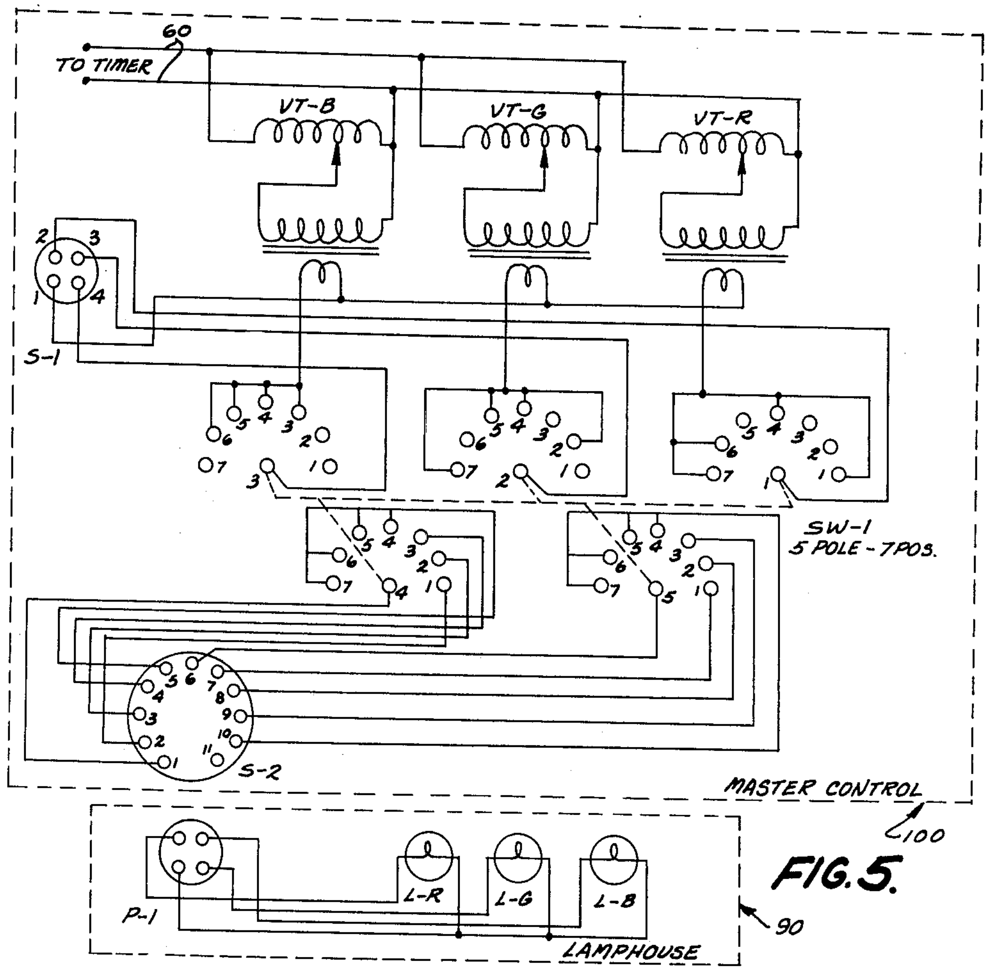
FIG. 5 is a circuit diagram of the master control.
Figure 6:
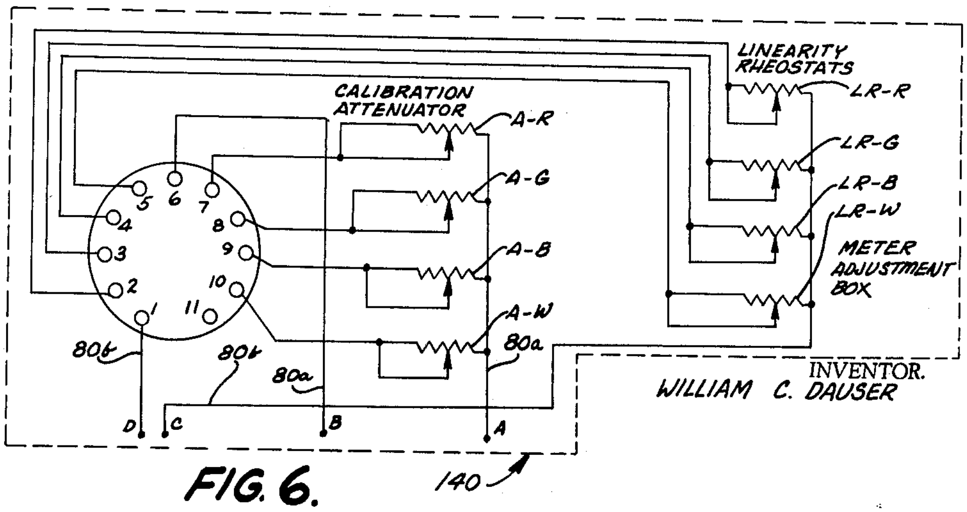
FIG. 6 is a circuit diagram of the meter calibration apparatus.

A film 206 which is to be analyzed, printed or evaluated is placed on the holder 212 beneath bellows 214 and below the variable condenser 216 which includes lenses 200 and 202. Any of these operations may be achieved with the circuitry illustrated in FIGS. 4, 5 and 6. It will be understood after an explanation of the circuitry, that it may be varied somewhat, although this circuitry is preferred, since it affords excellent control over the novel head for film analysis, color reproduction, printing and the like.

The voltage input for each of the light sources L-R, L-G and L-B is independently controlled by variable transformers VT-R, VT-G, and VT-B for the respective red, green and blue lamps. In FIG. 1, the dials controlling the variable transformers are illustrated on master control 100. These dials allow control of the voltage input and thus the intensity output of each source. Moreover, general control switch SW-1 which is a five pole, seven position switch enabling any one, two or three of three lamps to be operated simultaneously.

Power to the entire apparatus is obtained through line 40 (FIGS. 1 and 4) as controlled by a main on-off switch SW-101. The alternating input is put through rectifier 400 mounted in housing 160 of meter M-20. Meter M-20 is essentially a voltage meter which is preferably calibrated in terms of density units to indicate the density of particular areas to film negative 206. Power from the rectifier 400 is applied to the cathode of amplifier 402. Voltage signals from amplifier 402 are registered on voltage meter M-20. The voltage signals sent to meter M-20 are determined by photo-multiplier tube PM-10 which obtains cathode voltage from rectifier 400 through line 50. Photo-multiplier tube PM-10 essentially comprises a probe which can be placed upon easel 120 beneath the enlarger and printer apparatus 110 to detect the amount of light projecting unto the easel at certain portions thereof. Thus, by movement of the photo-multiplier tube around on the easel, varying amounts of light transmitted through the film will fall on the probe mirror 89 to be reflected into the probe. The voltage output of the photo-multiplier tube varies with the amount of light. The signal passes through line 52 to control the grid of amplifier tube 402. This controls the signal across the amplifier tube so that the voltage output of the amplifier varies inversely with the amount of light projected onto mirror 89 of the photo-multiplier tube. Thus, the voltage reading registered on meter M-30 will be in inverse relationship to the amount of light passed through the film unto easel 120. Since the amount of light transferred through the film varies inversely with the density of the portion of the film involved, the voltage on meter M-20 will be in direct proportion to the density of that area of the film. The density of any area depends upon the original exposure of that area of the film negative. The greater the exposure, the greater will be the amount of developed dye and free silver in that area, thus creating a greater density and lower light transmission therethrough.

Switch SW-106 cuts the photo-multiplier tube PM-10 into and out of the circuit as desired. The amplifier circuit includes a suitable conventional feedback 440 for stabilization. Beyond the amplifier 402 is control switch SW-1 which controls the selection of one, two, or three lamps L-R, L-G, and L-B either singly or in some combination as desired. It also correlates each lamp with its respective attenuator rheostat and linearity rheostat as explained hereinafter. To complete the circuit, meter M-20 is connected to ground G.

The attenuator rheostats A-R, A-G, A-B and A-W essentially comprise instrument calibrating attenuators in series with meter M-20 to enable the meter to be adjusted for sensitivity, and for "zeroing in" the meter for each of the individual respective lamps, red, green and blue, and the total of red, green, and blue, i.e., white.

Figure 4:
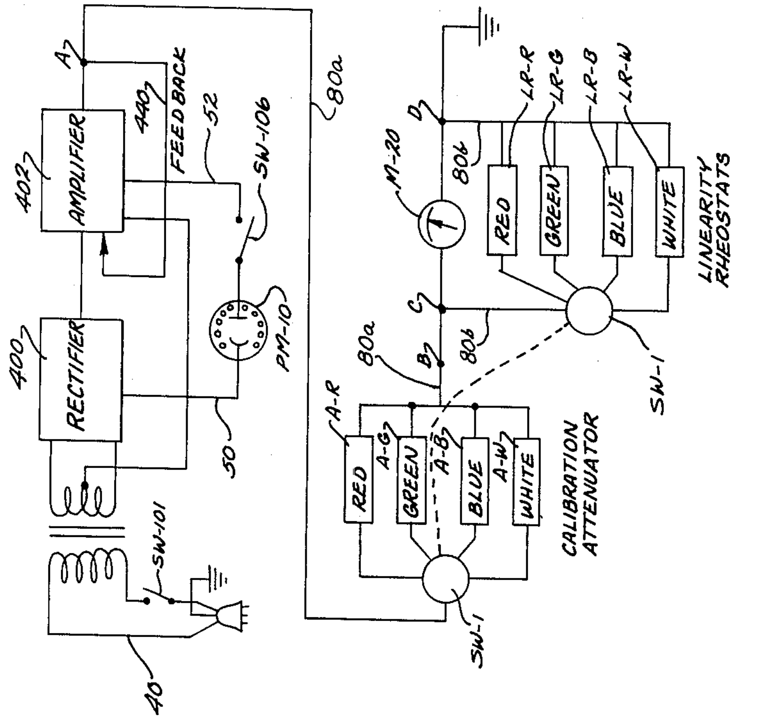
FIG. 4 is a general schematic block diagram of the electrical control mechanism of this apparatus.

The linearity rheostats LR-R, LR-G, LR-B and LR-W are connected in parallel across the meter. These also enable calibration of the meter to cause exact linear relationship of the meter reading in terms of the inverse of the light transmitted through film 206 in the enlarger. These attenuator rheostats and linearity rheostats shown in block diagram form in FIG. 4 are shown more specifically in FIG. 5. It will be noted that terminals D and C, correlate to the terminals D and C in FIG. 4, and that terminals A and B in FIG. 8, correlate with terminals A and B in FIG. 4.

As stated, the five pole, seven position switch SW-1 correlates respective attenuators, lamps and linearity rheostats. More specifically, with switch SW-1 in position 1, variable transformer VT-R and lamp L-R (red) are in circuit through pin and socket connection 2 on plug P-1 and socket S-1. Also, at the same time, variable attenuator rheostat A-R for the red lamp is connected in the active portion of the circuit by pin and socket connection 7 of plug P-2 and socket S-2, and pole 5 of switch SW-1. Linearity rheostats LR-R for red light source L-R is also connected in the circuit through pole 4 of the switch, and through pin and socket connection 2 of switch S-2 and plug P-2.

When switch SW-1 is moved to the second position, bulb L-G (green) as well as variable transformer VT-G are connected in the circuit through pin and socket connection 3 of socket S-1 and plug P-1. Simultaneously, attenuator adjust rheostat A-G is connected in the circuit through pin and socket 8 of plug P-2 and socket S-2, and then through pole 5 of switch SW-1. Linearity rheostat LR-G is connected in the circuit through pole 4 of switch SW-1, and pin and socket connection 3 of plug P-2 and socket S-2.

In a similar manner, source L–B, variable transformer VT–B, attenuator rheostat A–B and linearity rheostat LR–B are in circuit together in position 3 of switch S–1 (for blue). In position 4 of switch SW–1, all of the lamps and their respective controllers and signal modifiers are energized. Therefore, lamp L–R, L–G, and L–B, variable transformers VT–R, VT–G, VT–B, attenuator A–W (white), and linearity adjust LR–W (white) are all in circuit.

In position 5 of switch SW–1, the green and blue sources are both actuated as well as their variable transformers, attenuator rheostats, and linearity rheostats. In position No. 6 of switch SW–1 colors red and blue are activated including their lamp, variable transformers, attenuators, and linearity rheostats. In position 7 of switch SW–1, colors green and red are simultaneously activated including their variable transformers, attenuator rheostats, and linearity rheostats.

Thus, it will be readily realized that a basic selection of colors include red, green, blue, red+green+blue (white), red+green (cyan), blue+red (magenta) and green+red (yellow) is possible. Moreover, by varying the individual variable transformers VT–B, VT–G, and VT–R, the primary color components which combine to form the composite light projected from opal diffuser 350 can be varied in an unlimited manner to produce any color of any hue, value or intensity. The number of different colors which can be produced is only limited by the human ability to visually distinguish between them, since the variation of the three variable transformers is practically infinite.

Although this apparatus is explained using the common primary colors, red, green and blue, any three primary colors such as magenta, cyan, and yellow, which combine to form achromatic light can be utilized. Further, this invention is explained using a film negative 206. However, the apparatus would be equally useful with a "positive" at 206.

*Operation*

In utilizing the novel apparatus, power is supplied by plugging the cord 40 into a suitable electrical outlet. Next, switch SW–101 is closed to provide power to rectifier 400, amplifier 402, and the cathode of photo-multiplier tube PM–10 which serves as a probe on the easel 120 of the enlarger apparatus 110. Switch SW–106 connects the photo-multiplier tube into the circuit to control the grid on amplifier 402. If no light is falling on the photo-multiplier tube, the voltage signal from the amplifier through the seven position, five pole switch SW–1 and through the attenuator rheostats A–R, A–G, A–B and A–W to meter M–20 is approximately zero. Before the negative film 206 is inserted, the voltage meter M–20 which measures the density according to a voltage signal is calibrated. It is calibrated for each color, red, green and blue and for a white light. The meter is "zeroed in" by adjustment of the respective attenuator rheostats A–R, A–G, A–B and A–W when the respective lights, red, green, blue and white are projected unto probe by successive activation of sources L–R, L–G, L–B, and then all three simultaneously. This is done by shifting switch SW–1 to positions 1, 2, 3 and then 4.

Next, the meter is calibrated to cause the density reading on the seal to be exactly linear with respect to changes in light passing through the optical system. Thus, switch SW–1 is again placed through positions 1, 2, 3 and 4 to adjust the respective rheostats LR–R for red, LR–G for green, LR–B for blue, and LR–W for white.

The three individual variable transformers can be adjusted to obtain optimum color balance of light projected through the negative unto its print paper placed on easel 120. This is achieved by analyzing the color characteristics of each primary color which projects through the negative. By utilizing the probe, voltage meter and switch selector SW–1 red light is passed through the optical apparatus unto the probe to determine the optical characteristics of the negative 206 with respect to red. Then, green is analyzed in the same way, and then blue. Appropriate adjustments of the variable transformers VT–R, VT–G and VT–B enable the proper color balance to be obtained and transmitted through the negative on the print paper to achieve optimum balance conditions. Thus, the print will be superior in balance to the negative from which the print is taken. Specific methods of analysis are explained in greater detail in my co-pending application entitled Color Control Method and filed May 17, 1962, Serial No. 195,501. By utilizing this novel apparatus, not only may excellent prints with optimum color balance be achieved, but also any particular color may be produced. The number of colors is limited only by the ability to distinguish them from each other.

As far as is known, this is the first time that anyone has been able to provide an enlarger with an infinitely variable and controllable light source which forms a primary source for the enlarger, but actually comprises a secondary source since composed of three other primary sources. As far as is known, this is the first successful adaptation of simultaneous exposure of "additive" light for these purposes.

It should be understood that the novel lamphouse and controls can be used with an ellipsoidal mirror photographic apparatus equally well as with the conventional condenser enlarger system illustrated.

Various other advantages and modifications of the novel apparatus will occur to those in the art upon studying the foregoing specification. These modifications are deemed to be part of this invention which is to be limited only by the scope of the appended claims and the reasonably equivalent structures to those defined therein.

I claim:

1. A color lamphouse comprising: light source means for providing a plurality of light beams arranged around a central axis; spectral range selector means associated with said light source means to cause said beams to be of primary colors; said spectral range selector means comprising multifilm spectral selectors constructed of a transparent base coated with multiple coatings of materials whose light transmission characteristics vary with the angle of incidence of said light beams; means adapted to direct said beams of primary colors along said central axis; and an opal diffuser on said axis in the path of said beams to combine said beams to form a light source of selected characteristics.

2. A color lamphouse adapted to provide additive light of three primary colors simultaneously comprising: a plurality of white light, primary-source lamps arranged around a central axis; variable input control means for each of said source lamps; multifilm spectral selection means in the beam of each of said source lamps of a spectral range to provide three primary color beams from the sources; said selection means constructed of a transparent base coated with multiple coatings of materials whose light transmission characteristics vary with the angle of incidence of said light beams; means along said central axis to intercept and scatter said three primary color beams; and a semi-spherical opal diffuser means encompassing said scattered color beams to collect and integrate said beams into a composite light source, whereby, by regulation of the input control means of each of said white light sources, the composite light source can be varied over a large color range.

3. A color lamphouse comprising: light source means for providing a plurality of light beams arranged around a central axis; spectral range selector means associated with said light source means to cause said beams to be of primary colors; said spectral range selector means comprising at least two multifilm spectral selectors for each light beam and constructed of a transparent base coated with multiple coatings of materials whose light transmission characteristics vary with the angle of incidence of said light beams; one of said selectors for transmitting the primary color of lowest frequencies having a first single frequency cut-off and transmitting all frequencies below such first single frequency cut-off; one of said selectors for transmitting the primary color of highest frequencies having a second single frequency cut-off and transmitting all frequencies above such second single frequency cut-off; one of said selectors for transmitting the primary color of frequencies intermediate the frequencies of said first and second frequency cut-offs having third and fourth frequency cut-offs defining a band of frequencies which it transmits; said other selectors for each light beam each being matched with one of said one selectors and having single cut-offs for cutting out the transmission of light rays of undesirable frequencies falling within the range of frequencies of the one selector to which it is matched; means adapted to direct said beams of primary colors along said central axis; and an opal diffuser on said axis in the path of said beams to combine said beams to form a light source of selected characteristics.

4. A color lamphouse adapted to provide additive light of three primary colors simultaneously comprising: a plurality of white light, primary-source lamps arranged around a central axis; variable input control means for each of said source lamps; multifilm spectral selection means in the beam of each of said source lamps of a spectral range to provide three primary color beams from the sources; said spectral range selector means comprising at least two multifilm spectral selectors for each light beam and constructed of a transparent base coated with multiple coatings of materials whose light transmission characteristics vary with the angle of incidence of said light beams; one of said selectors for transmitting the primary color of lowest frequencies having a first single frequency cut-off and transmitting all frequencies below such first single frequency cut-off; one of said selectors for transmitting the primary color of highest frequencies having a second single frequency cut-off and transmitting all frequencies above such second single frequency cut-off; one of said selectors for transmitting the primary color of frequencies intermediate the frequencies of said first and second frequency cut-offs having third and fourth frequency cut-offs defining a band of frequencies which it transmits; said other selectors for each light beam each being matched with one of said one selectors and having single cut-offs for cutting out the transmission of light rays of undesirable frequencies falling within the range of frequencies of the one selector to which it is matched; means along said central axis to intercept and scatter said three primary color beams; and a semi-spherical opal diffuser means encompassing said scattered color beams to collect and integrate said beams into a composite light source, whereby, by regulating of the input control means of each of said white light sources, the composite light source can be varied over a large color range.

References Cited by the Examiner

UNITED STATES PATENTS

| | | | |
|---|---|---|---|
| 733,090 | 7/1903 | Szczepanik. | |
| 2,402,660 | 6/1946 | O'Grady | 88—24 |
| 2,438,219 | 3/1948 | Johnston | 88—24 |
| 2,470,584 | 5/1949 | Simmon | 88—24 |
| 2,553,285 | 5/1951 | Thomas | 88—24 |
| 2,731,264 | 1/1956 | Dockum | 88—24 X |
| 2,741,944 | 4/1956 | Gunther | 88—24 |
| 2,909,097 | 10/1959 | Alden et al. | |
| 2,912,488 | 11/1959 | Smith et al. | |

FOREIGN PATENTS

| | | |
|---|---|---|
| 207,304 | 5/1956 | Australia. |
| 1,154,963 | 11/1957 | France. |
| 932,880 | 9/1955 | Germany. |
| 538,816 | 1/1956 | Italy. |

NORTON ANSHER, *Primary Examiner.*

EMIL G. ANDERSON, *Examiner.*